(12) United States Patent
Mukherji et al.

(10) Patent No.: US 11,150,864 B2
(45) Date of Patent: Oct. 19, 2021

(54) DISPLAYING ENHANCEMENT ITEMS ASSOCIATED WITH AN AUDIO RECORDING

(71) Applicant: Microsoft Technology Licensing, LLC, Redmond, WA (US)

(72) Inventors: Rishav Mukherji, Seattle, WA (US); Jaewon Hwang, Bellevue, WA (US); Michael Vincent Mills Santos, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/942,725

(22) Filed: Apr. 2, 2018

(65) Prior Publication Data

US 2019/0303089 A1 Oct. 3, 2019

(51) Int. Cl.
| | |
|---|---|
| *G06F 17/00* | (2019.01) |
| *G06F 3/16* | (2006.01) |
| *G06F 3/0484* | (2013.01) |
| *G10L 21/12* | (2013.01) |
| *G11B 27/34* | (2006.01) |
| *G10L 15/26* | (2006.01) |

(52) U.S. Cl.
CPC .......... *G06F 3/165* (2013.01); *G06F 3/04847* (2013.01); *G10L 21/12* (2013.01); *G11B 27/34* (2013.01); *G10L 15/26* (2013.01)

(58) Field of Classification Search
CPC .. G06F 3/165; G06F 3/04847; G06F 17/2765; G06F 17/30746; G06F 3/0485; G06F 3/0484; G10L 21/12; G10L 15/26; G11B 27/34

USPC .......................................................... 715/716
See application file for complete search history.

(56) References Cited

U.S. PATENT DOCUMENTS

| | | | |
|---|---|---|---|
| 9,202,469 B1 | 12/2015 | Moorjani et al. | |
| 9,412,372 B2 | 8/2016 | Henry et al. | |
| 9,703,771 B2 | 7/2017 | Pottier et al. | |
| 2010/0235782 A1* | 9/2010 | Powell | G06F 19/3418 715/809 |
| 2010/0247061 A1* | 9/2010 | Bennett | H04N 21/4622 386/247 |
| 2012/0066592 A1* | 3/2012 | Issa | G06F 3/0485 715/716 |

(Continued)

OTHER PUBLICATIONS

"AudioNote Lite", Retrieved from: <<https://web.archive.org/web/20140526122621/https:/play.google.com/store/apps/details?id=com.luminant.audionote.lite>>, May 26, 2014, 3 Pages.

(Continued)

*Primary Examiner* — Jason T Edwards
(74) *Attorney, Agent, or Firm* — NovoTechIP International PLLC (57) ABSTRACT

Systems, methods, and software are disclosed herein for displaying visual representations of entities associated with an audio recording. A waveform associated with an audio recording is presented in a user interface to an application. A set of entities associated with the audio recording are then identified. Responsive to identifying the set of entities, a set of enhancement items associated with the set of entities is presented. In response to a selection of a given one of the enhancement items, a visual representation of an associated one of the entities in the user interface to the application.

18 Claims, 10 Drawing Sheets

(56) References Cited

U.S. PATENT DOCUMENTS

| | | | | |
|---|---|---|---|---|
| 2012/0323575 | A1* | 12/2012 | Gibbon | G11B 27/34 |
| | | | | 704/246 |
| 2013/0198642 | A1* | 8/2013 | Carney | H04N 21/4307 |
| | | | | 715/738 |
| 2013/0308922 | A1* | 11/2013 | Sano | H04N 21/4316 |
| | | | | 386/245 |
| 2014/0035920 | A1* | 2/2014 | Duwenhorst | G06T 11/001 |
| | | | | 345/440 |
| 2016/0247533 | A1 | 8/2016 | Tanaka | |
| 2018/0053510 | A1* | 2/2018 | Kofman | G11B 27/031 |

OTHER PUBLICATIONS

"Cogi's Online Transcription Services will Automate Note Taking on Your Meetings and Calls", Retrieved from: <<https://web.archive.org/web/20091213025237/https:/cogi.com/online-transcription-services-and-note-taking-software>>, Dec. 13, 2009, 4 Pages.

"Smart Recorder and Transcriber", Retrieved from: <<https://itunes.apple.com/cy/app/smart-recorder-and-transcriber/id700878921?mt=8>>, Retrieved Date: Feb. 12, 2018, 2 Pages.

"Sonocent Recorder for iOS and Android", Retrieved from: <<https://www.sonocent.com/ennos-recorder>>, Retrieved Date: Feb. 12, 2018, 3 Pages.

"Voice Recorder", Retrieved from: <<https://play.google.com/store/apps/details?id=com.triveoussecorder>>, Retrieved Date: Feb. 12, 2018, 4 Pages.

Galloway, David, "Add Pictures to Your Audio Recordings with Snoozerr", Retrieved from: <<https://lifehacker.com/5828320/add-pictures-to-your-audio-recordings-with-snoozerr>>, Jun. 8, 2011, 2 Pages.

Haubold, et al., "Augmented Segmentation and Visualization for Presentation Videos", in Proceedings of 13th Annual ACM International Conference on Multimedia, Nov. 6, 2005, 4 Pages.

Marshall, Sarah, "SoundCloud Adds Trim and Edit Features to its Apps", Retrieved from: <<https://blogs.journalism.co.uk/2012/09/21/soundcloud-adds-trim-and-edit-features-to-its-apps/>>, Sep. 21, 2012, 5 Pages.

"IPadagogy—Recordium Tutorial"; Retrieved From: http://www.youtube.com/watch?v=PA1rqMdro-k, Jun. 27, 2013, 5 Pages.

"International Search Report and Written Opinion Issued in PCT Application No. PCT/US19/023781", dated Jun. 6, 2019, 12 Pages.

\* cited by examiner

DISPLAYING ENHANCEMENT ITEMS ASSOCIATED WITH AN AUDIO RECORDING

TECHNICAL FIELD

Aspects of the disclosure are related to computing hardware and software technology, and in particular to display enhancement items associated with an audio recording.

TECHNICAL BACKGROUND

Many software applications provide users with the capability to record audio. These software applications include related utilities that offer user-interface techniques to capture a waveform of the audio recording. A waveform illustrates the shape and form of changes to a recorded signal's amplitude over the duration of the recording. Once a user has captured the audio recording within the software application, the waveform associated with the audio recording is displayed to a user. This waveform may be interacted with by a user using various commands, such as rewind, pause, fast-forward, etc. The waveforms associated with audio recordings may also be edited in a variety of applications, including speech applications, music applications, video applications, and may be especially useful in the context of capturing and editing audio recordings. The waveform may be edited using various commands such as, trimming sound bites, reducing selected acoustics, layering with additional audio recording waveforms, and saving in various formats. The waveform may be presented with additional data, such as videos or photos. Unfortunately, the software applications used for editing the waveform of the audio recording do not allow a user to dynamically view and edit additional data presented with the waveform.

OVERVIEW

An enhanced system, method, and software application is disclosed herein that improves displaying visual representations of entities associated with an audio recording. A waveform associated with an audio recording is presented in a user interface of an application. A set of entities associated with the audio recording are then identified. Responsive to identifying the set of entities, a set of enhancement items associated with the set of entities is presented. In response to a selection of a given one of the enhancement items, a visual representation of an associated one of the entities in the user interface to the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DESCRIPTION

Examples of the present disclosure describe an application for displaying an indication in a document of changes made to content at the source. A document is displayed in a user interface to an application. Content then is introduced into the document from a source external to the document. After the content has been introduced into the document, the source of the content is queried for any changes to the content at the source. If a change has occurred, an indication of the change to the content at the source is introduced in the document.

A technical effect that may be appreciated from the present discussion is the increased efficiency in presenting additional entities to a user along with the waveform (e.g., photos, websites, event times and locations, etc.) and allowing a user to view a visual representation of the entity within the audio recording application. The application described herein also improves the efficiency in allowing a user to separate the associated entities from the waveform and dynamically edit the entities (e.g., move an entity to a new timestamped location, remove an entity from the waveform timeline, etc.).

Further, examples herein described that the set of entities associated with the audio recording are identified by transcribing the audio recording into a text format. One or more portions of text are then identified from the text format of the transcribed audio recording. In this example, the one or more portions of text may comprise at least one of a name, website, event time, event location, and hashtag. In a further example, the set of entities associated with the audio recording are identified by capturing one or more entities along with the audio recording. In this example, the one or more entities may comprise at least one of a video and a photo.

In some scenarios, each of the enhancement items associated with the set of entities further includes a timestamp indicating a time which the entity was introduced to the audio recording. The waveform associated with the audio recording may also include bookmarks indicating marked locations on the waveform associated with one or more entities of the set of entities. In further implementations, in response to displaying the visual representation of the entity, the one or more processors configured to access the entity in an additional application (e.g., text document application, spreadsheet application, presentation application, collaborative editing application, or messaging application, such as an email application service). In other scenarios, each of the enhancement items associated with the set of entities further includes a display duration indicating a duration of time within which the enhancement item is presented along with the waveform in the user interface to the application.

In some implementations, the application comprises a view mode and an editing mode. The view mode may be used to view the summary of the enhanced items and an overview of the waveform. The editing view may be used to rearrange, add, delete, or otherwise modify the enhanced items on the waveform. In this implementation, in response to receiving an editing mode selection, at least one of the enhancement items is displayed in an original location on the waveform associated with the audio recording. The application may then receive an instruction to modify the location of the at least one of the enhancement items on the waveform. In response to the instruction, the at least one of the enhancement items is displayed in the modified location on the waveform.

Figure 1:
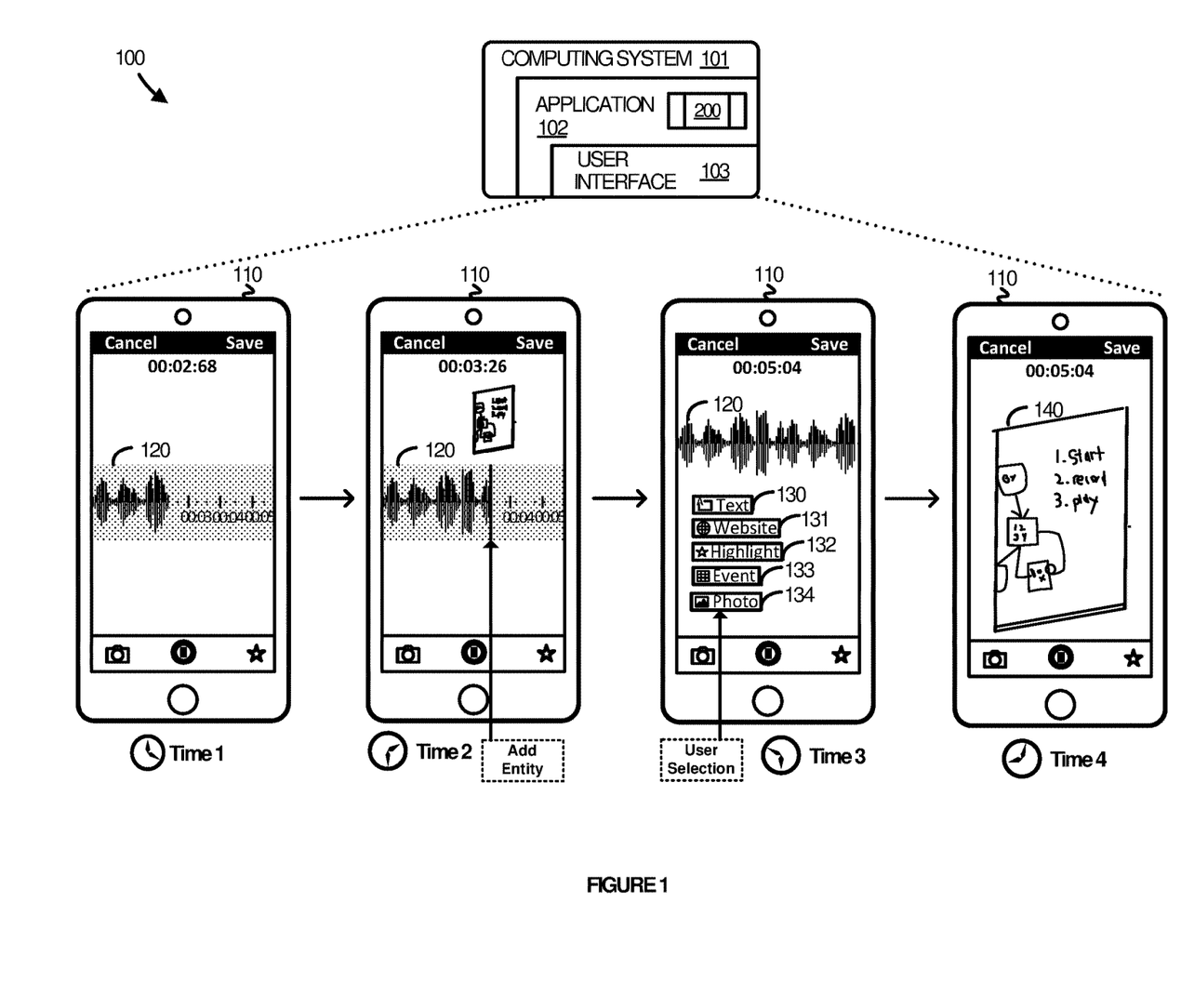
FIG. 1 illustrates an operational architecture for implementing an enhanced application to display visual representations of entities associated with an audio recording.

Referring to the drawings, FIG. 1 illustrates an exemplary operational architecture 100 related to processing operations for management of an exemplary enhanced system with which aspects of the present disclosure may be practiced. Operational environment 100 includes computing system 101 comprising application service 102. Application service 102 employs a presentation process 200 in the context of producing views in a user interface 103. User interface 103 displays a waveform of an audio recording to users produced by application service 101.

Figure 10:
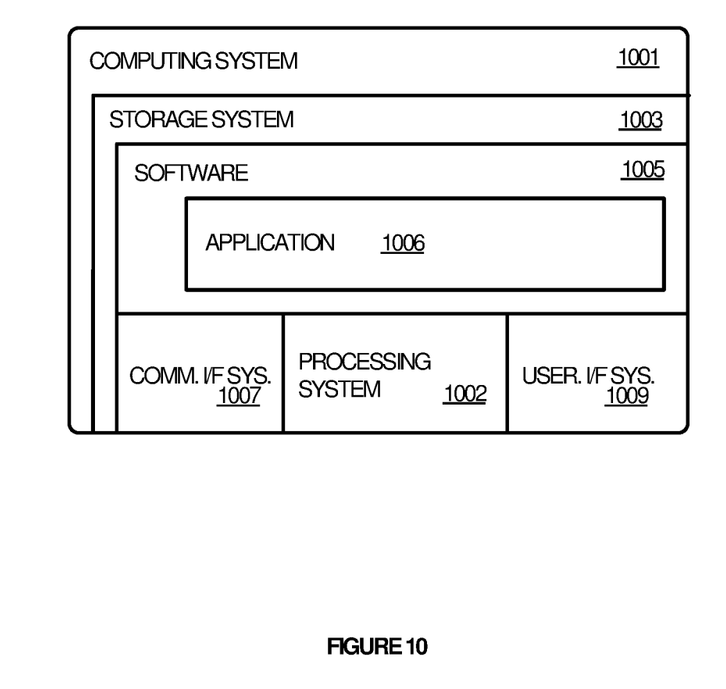
FIG. 10 illustrates a computing system suitable for implementing the technology disclosed herein, including any of the architectures, processes, operational scenarios, and operational sequences illustrated in the Figures and discussed below in the Technical Description.

Computing system 101 is representative of any device capable of running an application natively or in the context of a web browser, streaming an application, or executing an application in any other manner Examples of computing system 101 include, but are not limited to, personal computers, mobile phones, tablet computers, desktop computers, laptop computers, wearable computing devices, or any other form factor, including any combination of computers or variations thereof. Computing system 101 may include various hardware and software elements in a supporting architecture suitable for performing presentation process 200. One such representative architecture is illustrated in FIG. 10 with respect to computing system 1001.

Application service 101 includes a software application or application component capable of displaying visual representations of entities with a waveform associated with an audio recording in accordance with the processes described herein. Examples of the software application include, but are not limited to, speech editing applications, music editing applications, video editing applications, and any other type of combination or variation thereof. The software application may be implemented as a natively installed and executed application, a web application hosted in the context of a browser, a streamed or streaming application, a mobile application, or any variation or combination thereof.

User interface 103 includes representative view 110 that may be produced by an audio capturing and editing application. Representative view 110 may present a waveform and various enhancement items associated with the entities, such as photos, videos, bookmarks, or portions of text (names, websites, hashtags, event time and locations). An end user may interface with application service 102 to view visual representations of the entities, such as a preview of the photo, video, webpage, calendar event, or any other type of entity associated with the audio recording and presented as an enhancement item in visual representation 110. It should be noted that the enhancement items may be dynamically added, deleted, or rearranged on the waveform associated with the audio recording.

The user may interface with application service 102 over user interface 103 using an input instrument such as a stylus, mouse device, keyboard, touch gesture, as well as any other suitable input device. The user may initiate a command to add an entity to the waveform, such as capturing a photo or video, inserting text, importing/exporting events, etc. In an enhancement, application service 102 provides the ability to edit the locations or representative view of the entities when a user instructs so in user interface 103.

Figure 2:
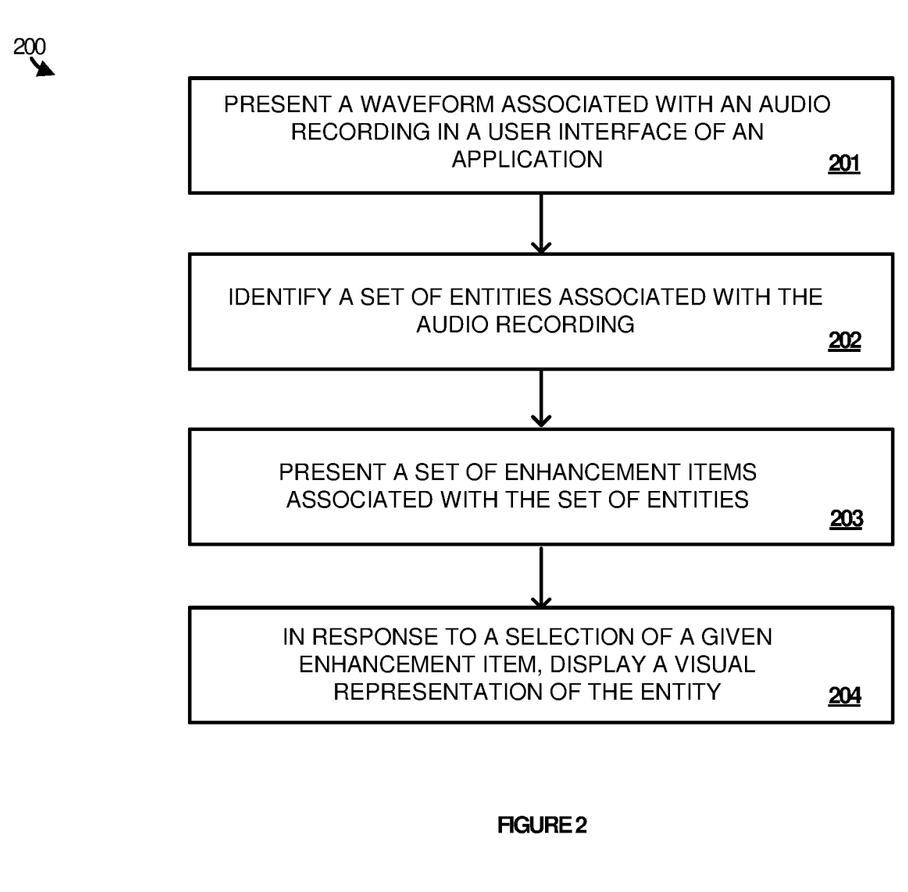
FIG. 2 illustrates a presentation process employed in implementations of an enhanced application to display visual representations of entities associated with an audio recording.

More particularly, FIG. 2 illustrates presentation process 200 which, as mentioned, may be employed by application service 102 to display visual representations of entities associated with an audio recording as described herein. Some or all of the steps of presentation process 200 may be implemented in program instructions in the context of a component or components to the application used to carry out the visual representation display feature. The program instructions direct application service 102 to operate as follows, referring parenthetically to the steps in FIG. 2 in the context of FIG. 1.

In operation, application service 102 presents waveform 120 associated with an audio recording in user interface 103 (step 201). Waveform 120 illustrates the shape and form of changes to a recorded signal's amplitude over the duration of the recording. The waveform may be interacted with by a user using various commands, such as rewind, pause, fast-forward, etc. As illustrated in FIG. 1, waveform 120 is captured at Time 1. During the capture of Time 1, some entities may be associated with waveform 120. Once the audio recording is captured, complete waveform 120 is displayed to the user.

Application service 102 then identifies a set of entities associated with the audio recording (step 202). Application service 102 may be configured to identify the set of entities by capturing one or more entities along with the audio recording. The captured entities may be a photo or video clip. For example, at Time 2 a photo is captured and added to the audio recording. Application service 102 may also be configured to identify the set of entities by transcribing the audio recording and extracting one or more entities which we referred to in the audio recording. The extracted entities may be a website, name, event time, event location, hashtag, etc. For example, speech in the audio recording may have stated a webpage to visit. After the audio recording is completed, the audio recording is transcribed and mined for entities of interest. The stated webpage would then be created into an entity that may be associated with the audio recording.

The entity may comprise an entity card which links the entity to an additional application service. Application service 102 may also create a data entity card and associate the data entity card with the audio recording. The entity may be stored on a data store container which may be accessed by application 102. The entity may also be stored within application 102 and accessed via a request by the user. In some examples, the entity may be stored by another application within computing system 101 or a cloud application, such as a photo library application, calendar scheduling application, etc. In some scenarios, the entity may be stored in a location external to computing system 101 and may be retrieved via a network connection (e.g. retrieve from a distributed storage, website, etc.).

Application service 102 may also associate the entities with the audio recording by uploading or attaching entities from various sources including, but not limited to, electronic word documents, spreadsheets, photos, text messages, website links, media content, articles, notes written in digital ink, etc. Application service 102 may receive the entity from user input using an input instrument such as a stylus, mouse device, keyboard, touch gesture, as well as any other suitable input device.

In a next operation, application service 102 presents a set of enhancement items 130-134 associated with the set of entities (step 203). Application service 102 may present the set of enhancement items 130-134 on a summary page. The summary page may include waveform 120 with a list of enhancement items 130-134 associated with the set of entities. Enhancement items 130-134 represent the entities in application service 102. For example, referring again to FIG. 1, at Time 3, the completed waveform 120 is displayed along with a list of enhancement items 130-134 which are each associated with entities that were captured or transcribed by the text. Enhancement items 130-134 comprise a reference to the entities, such as block of text (stating a name, a website link, a topic, etc.), a bookmark indicating a highlight in the audio recording, an event (with may include a time, location, other attendees, etc.), and a photo preview which was captured along with the audio recording.

In other examples, application service 102 presents the set of enhancement items 130-134 along waveform 120. For example, each of enhancement items 130-134 associated with the set of entities may further include a timestamp indicating a time which the entity was introduced to the audio recording. Each of enhancement items 130-134 may then be presented along waveform 120 at the location corresponding to the timestamp associated with the set of entities. In some scenarios, waveform 120 associated with the audio recording includes bookmarks indicating a marked location on the waveform associated with one or more entities of the set of entities. For example, a user may mark a point as important using a bookmark. An illustration of the enhancement items 130-134 presented along waveform 120 may be seen in FIG. 3.

In a final operation, in response to a selection of a given one of the enhancement items, application service 102 displays visual representation 140 of the entity in visual representation 110 of user interface 103 (step 204). Referring again to FIG. 1, at Time 3, a user selects photo 134 to view. Therefore, at Time 4, visual representation 140 of the entity (the photo) is displayed to the user in user interface 103. Application service 102 may display visual representation 140 based on a snapshot view of the entity. Application service 102 may further pull data associated with the entity from the entity source location and display a preview of the data in visual representation 110. For example, if the user selected the website title 131 to view, application service 102 may extract an abstract or first paragraph from the webpage and display it to the user as a preview of the entity. In another example, if a user selected an enhancement item stating a name, application service 102 may extract a preliminary search of the name and display a preview of the search results from a search engine.

In some examples, in response to displaying visual representation 140 of the entity in visual representation 110 of user interface 103, application service 102 may access the entity in an additional application. For example, application service 102 may transfer event enhancement item 133 to a calendar application. Application service 102 may then access the event calendar entry in calendar application external to application service 102 in response to a user selection of event enhancement item 133 and a request to view the entity by the user. In another example, application service 102 may access the entire contents of a webpage (the entity) in an internet search engine in response to a user selection to view the entity after previewing the entity via visual representation 140.

In other examples, application service 102 may further include a view mode and an editing mode. The view mode may be used to view the summary of enhanced items 130-134 and an overview of waveform 120. The editing view may be used to rearrange, add, delete, or otherwise modify enhanced items 130-134 on waveform 120. In this implementation, in response to receiving an editing mode selection, at least one of enhancement items 130-134 is displayed in an original location on waveform 120 associated with the audio recording. Application service 102 may then receive an instruction to modify the location of the at least one of enhancement items 130-134 on waveform 120 (e.g., moving enhancement item 130, deleting enhancement item 130, grouping enhancement items 130-132, etc.). In response to the instruction, the at least one of enhancement items 130-134 is displayed in the modified location on waveform 120. In other scenarios, each of enhancement items 130-134 associated with the set of entities further includes a display duration indicating a duration of time within which the enhancement item is presented along with the waveform in user interface 103 to application 102.

Figure 3:
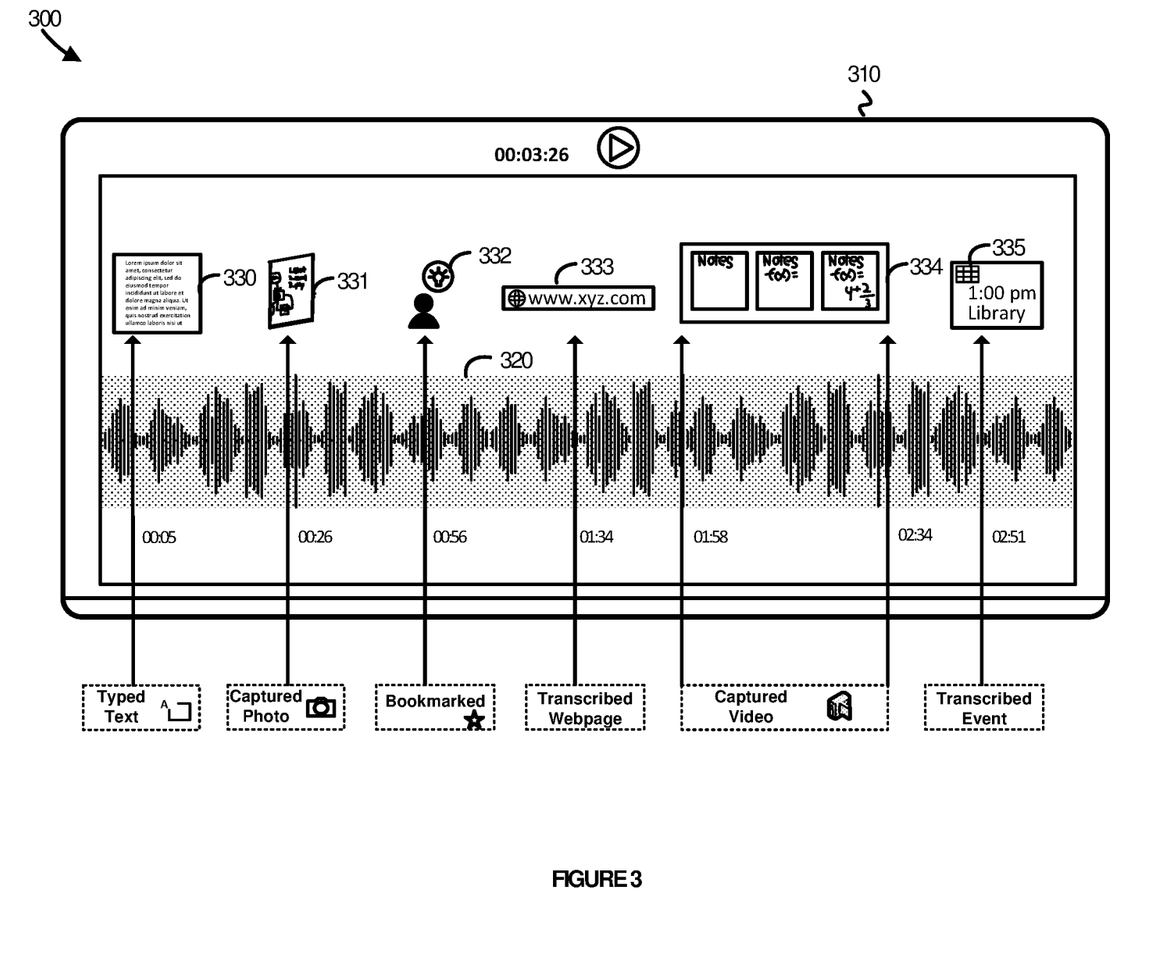
FIG. 3 illustrates a user interface of a waveform in an implementation of an enhanced application to display visual representations of entities associated with an audio recording.

FIG. 3 illustrates application environment 300 that may be used according to one or more implementations of the present technology. According to the scenario shown in FIG. 3, user interface 310 presents waveform 320. In accordance with various implementations, a user may view the entire waveform 320 along with each of enhancement items 330-335. Enhancement items 330-335 may be presented in the locations on waveform 320 based on timestamps associated with when the entities were introduced into the audio recording. It should further be noted that the locations of each of enhancement items 330-335 may have been moved or added and do not reflect the original timestamp associated with the introduction of each of the entities into the audio recording. For example, a photo may have been taken later in the audio recording and timestamped to a location further down waveform 320. The user may modify the location of enhancement item 331 associated with the photo entity to an earlier location on waveform 320, which may more accurately reflect to time that the content regarding the photo entity was discussed in the audio recording.

In this example scenario, enhancement 331 associated with a photo entity was captured by the user at 00:26 s of the audio recording. Enhancement item 334 associated with a video entity was captured from 01:58 s through 02:34 s. Additionally, text was entered by the user including typed notes at 00:05 s. As illustrated by enhancement item 332 associated with a bookmark entity, the user marked a part of waveform 320 as important at 00:56 s. Finally, the audio recording was transcribed and enhancement item 333 associated with webpage "www.xyz.com" and enhancement items 335 associated with event entity were extracted and timestamped as 01:34 s and 02:51 s respectively.

Figure 4:
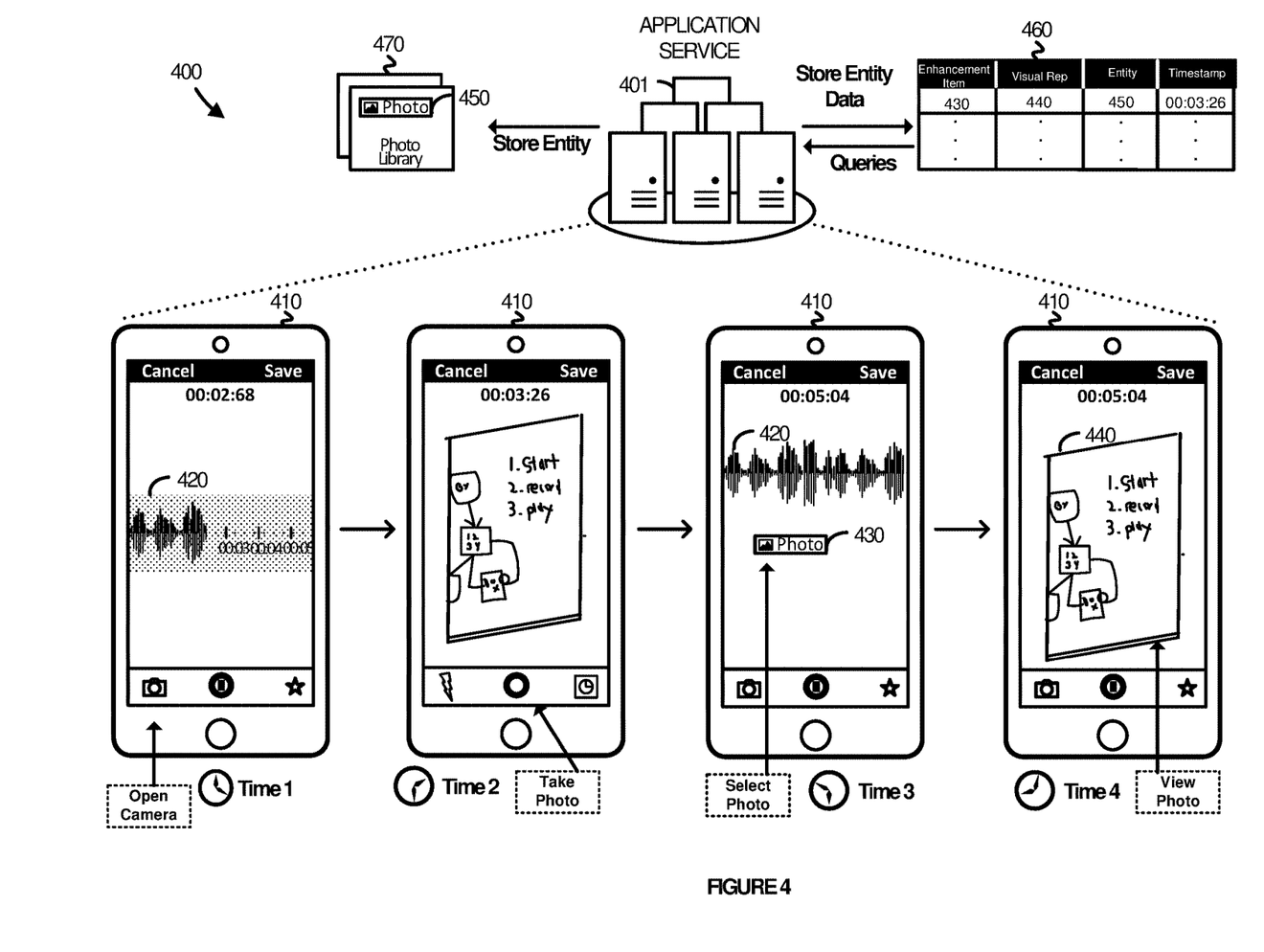
FIG. 4 illustrates an operational architecture in an implementation of an enhanced application to display visual representations of entities associated with an audio recording.

FIG. 4 illustrates an exemplary operational architecture for displaying visual representations of entities associated with an audio recording that may be used in one or more scenarios of the present technology. FIG. 4 illustrates an operational scenario 400 that relates to what occurs when a photo is captured along with the audio recording and an enhancement item associated with the photo is generated. Operational scenario 400 includes application service 401, user interface 410, data structure 460, and photo library service 470.

Data structure 460 tracks the introduction of each entity, the timestamp at which the entity was introduced into the audio recording, the enhancement item associated with the entity, and a visual representation of the entity. For example, photo entity 450 was captured at 00:03:26 s in the audio recording timeline, is associated with enhancement item 430, and visual representation 440. It should be noted that although photo entity 450 may have been captured in application service 401, photo entity 450 may be stored in photo library service 470. User interface 410 includes waveform 420, enhancement item 430 associated with entity 450, and visual representation 440 associated with entity 450.

At Time 1, a user is capturing the audio recording and decides to open the camera mode of application 401. In a next step, at Time 2, the user views and captures the photo entity 450. At some point in the process (either in real-time or once the audio recording has been captured), the photo entity 450 is transferred and stored in photo library service 470. Photo entity 450 is also stored and tracked in data structure 460. At Time 3, application service 401 receives a user request to view photo entity 450 based on a user selection of enhancement item 430 associated with photo entity 450. In response to the user selection, at Time 4, application service 401 queries data structure 460 to determine visual representation 440 of photo entity 450 and displays visual representation 440 to the user in user interface 410.

Figure 5:
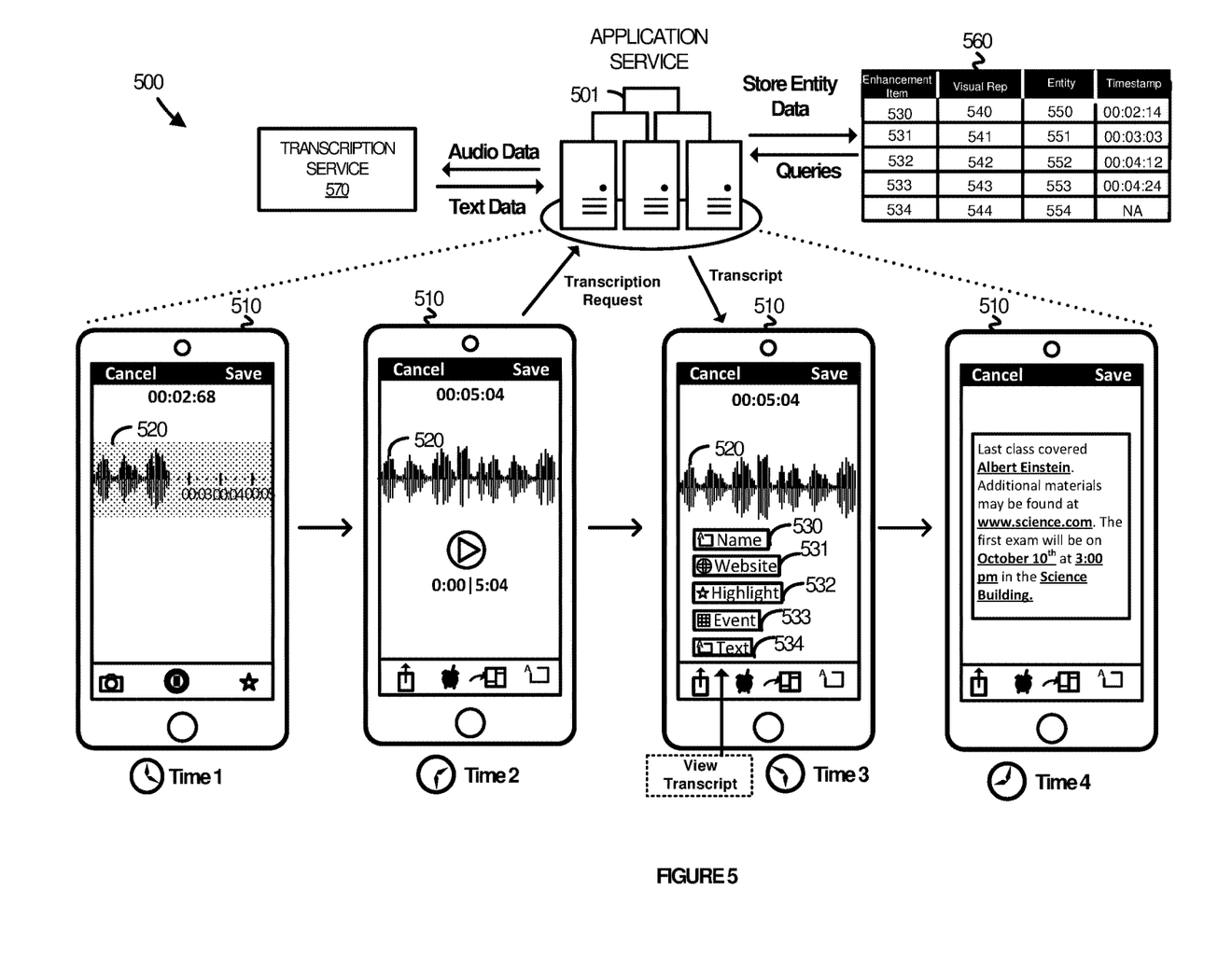
FIG. 5 illustrates an alternative operational architecture in an implementation of an enhanced application to display visual representations of entities associated with an audio recording.

FIG. 5 illustrates an exemplary operational architecture for displaying visual representations of entities associated with an audio recording that may be used in one or more scenarios of the present technology. FIG. 5 illustrates an operational scenario 500 that relates to what occurs when an audio recording is transcribed and enhancement items associated with the entities are extracted from the transcribed audio recording. Operational scenario 500 includes application service 501, user interface 510, data structure 560, and transcription service 570.

Data structure 560 tracks the introduction of each entity, the timestamp at which the entity was introduced into the audio recording, the enhancement item associated with the entity, and a visual representation of the entity. For example, name entity 550 was captured at 00:02:14 s in the audio recording timeline, is associated with enhancement item 530, and a view of the transcribed data. It should be noted that although name entity 550 may have been transcribed by transcription application service 570, name entity 550 may be stored in an additional application, such as a contact list in a user address book application. User interface 510 includes waveform 520, enhancement items 530-533 associated with entities 550-553, and visual representations 540-543.

At Time 1, a user is capturing the audio recording. In a next step, at Time 2, application service 501 presents completed waveform 520 to the user and requests a transcription of the audio recording from transcription application service 570. Transcription application service 570 transcribes the audio data from the audio recording into text data and transfers the text data to application service 501. At his point, application service 501 extracts the entities and stores the entity data in data structure 560. At Time 3, application service 501 displays enhancement items 530-533 to the user in a summary page along with wave form 520 associated with the audio recording. In response to a user selection to view the transcription, at Time 4, application service 501 generates view of the transcribed audio recording. As illustrated in FIG. 5, the enhanced items are included in the view of the transcribed audio recording and may be selected to be view by a user.

Figure 6:
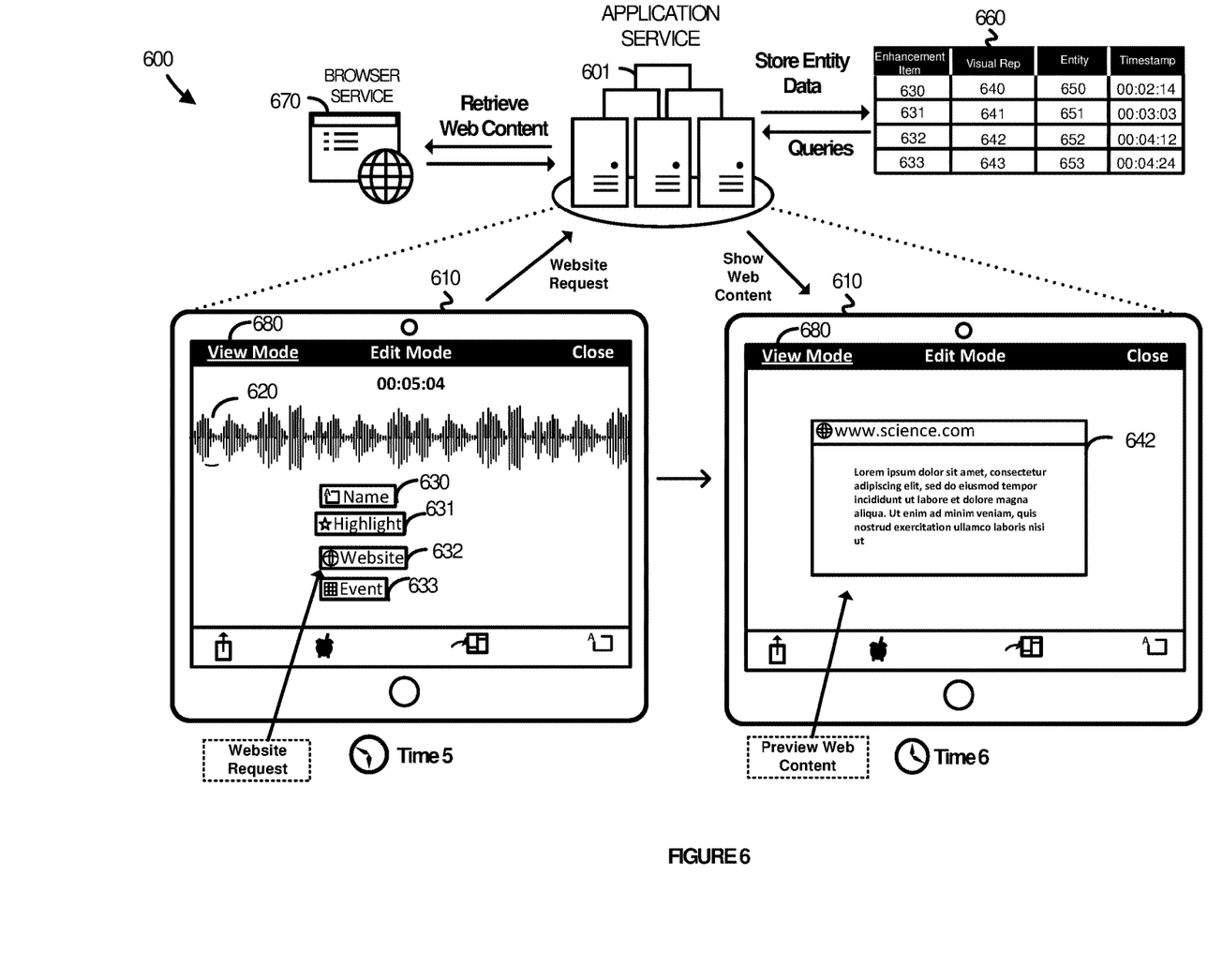
FIG. 6 illustrates an alternative operational architecture in an implementation of an enhanced application to display visual representations of entities associated with an audio recording.

FIG. 6 illustrates an additional operational architecture from FIG. 5 for displaying visual representations of entities associated with an audio recording that may be used in one or more scenarios of the present technology. FIG. 6 illustrates an operational scenario 600 that relates to what occurs when a visual representation of content from a website is displayed to a user of an audio recording. Operational scenario 600 includes application service 601, user interface 610, waveform 620, and enhancement items 630-633 which as displayed in view mode 680. As previously discussed above in FIG. 5, enhancement items 630-633 have been extracted from a transcription of the audio recording.

Continuing in this scenario, at Time 5, a user has opened the view mode on a tablet and requests to preview a website indicated by enhancement item 632. In response to the preview request, application service 601 queries data structure 660 for website entity 652. Visual representation 642 is then generated by retrieving a portion of the webpage and transferring the preview to user interface 610. At Time 6, user interface 610 then displays visual representation 642 of website entity 652 to the user.

Figure 7:
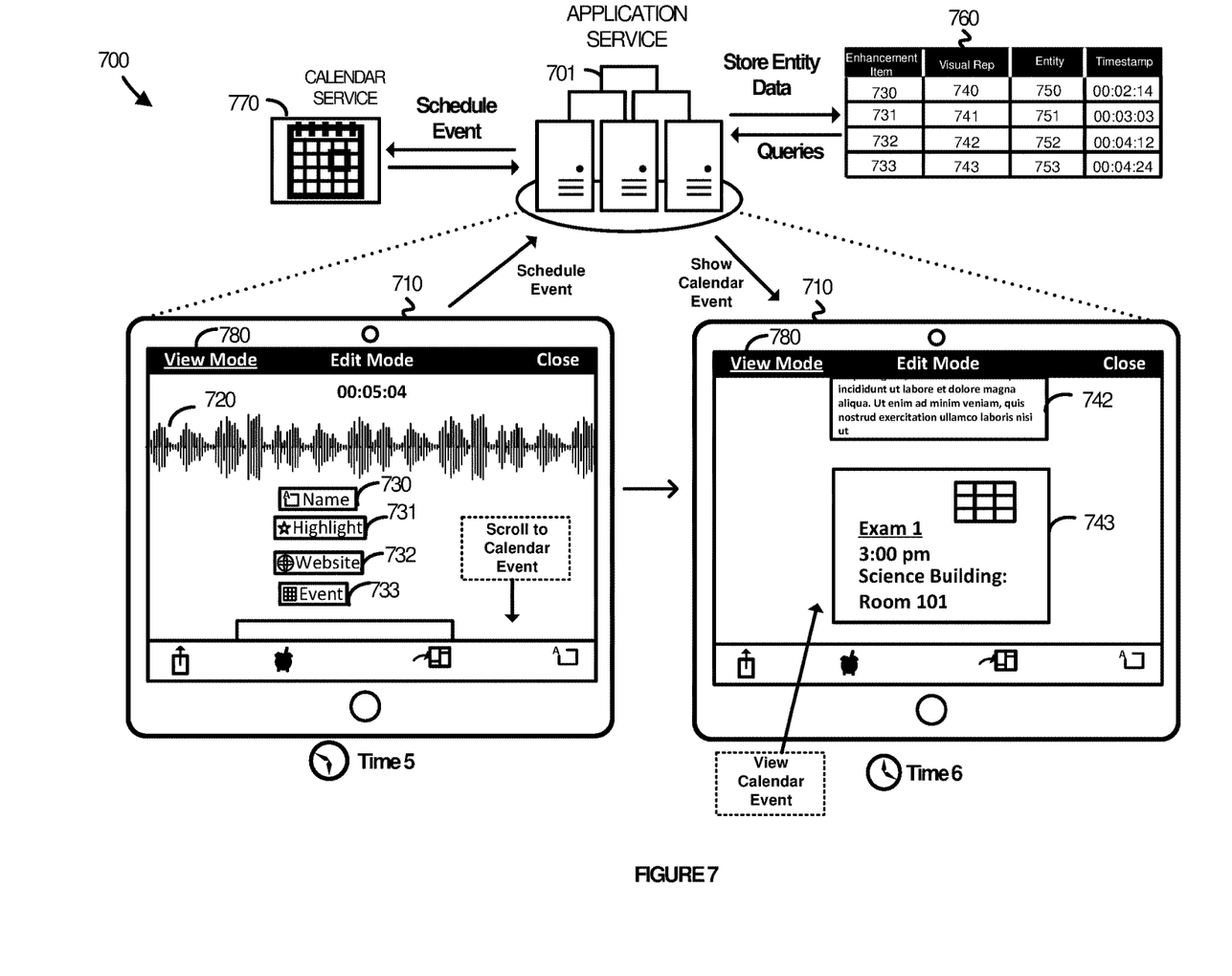
FIG. 7 illustrates an alternative operational architecture in an implementation of an enhanced application to display visual representations of entities associated with an audio recording.

FIG. 7 illustrates an alternative operational architecture from FIG. 5 for displaying visual representations of entities associated with an audio recording that may be used in one or more scenarios of the present technology. FIG. 7 illustrates an operational scenario 700 that relates to what occurs when a visual representation of a calendar event is displayed to a user of an audio recording. Operational scenario 700 includes application service 701, user interface 710, waveform 720, and enhancement items 730-733 which as displayed in view mode 780. As previously discussed above in FIG. 5, enhancement items 730-733 have been extracted from a transcription of the audio recording.

Continuing in this scenario, at Time 5, a user has opened the view mode on a tablet and scrolls down to preview a calendar event indicated by enhancement item 733. Application service 701 queries data structure 760 for entity 753. Visual representation 740 is then generated by retrieving a calendar invite generated by calendar service 770 and transferring the preview to user interface 710. At Time 6, after the user has scrolled down past the list of enhancement items 730-733 and through various cards illustrating visual representations 730-732, user interface 710 then displays visual representation 743 of calendar event entity 753 to the user.

Figure 8:
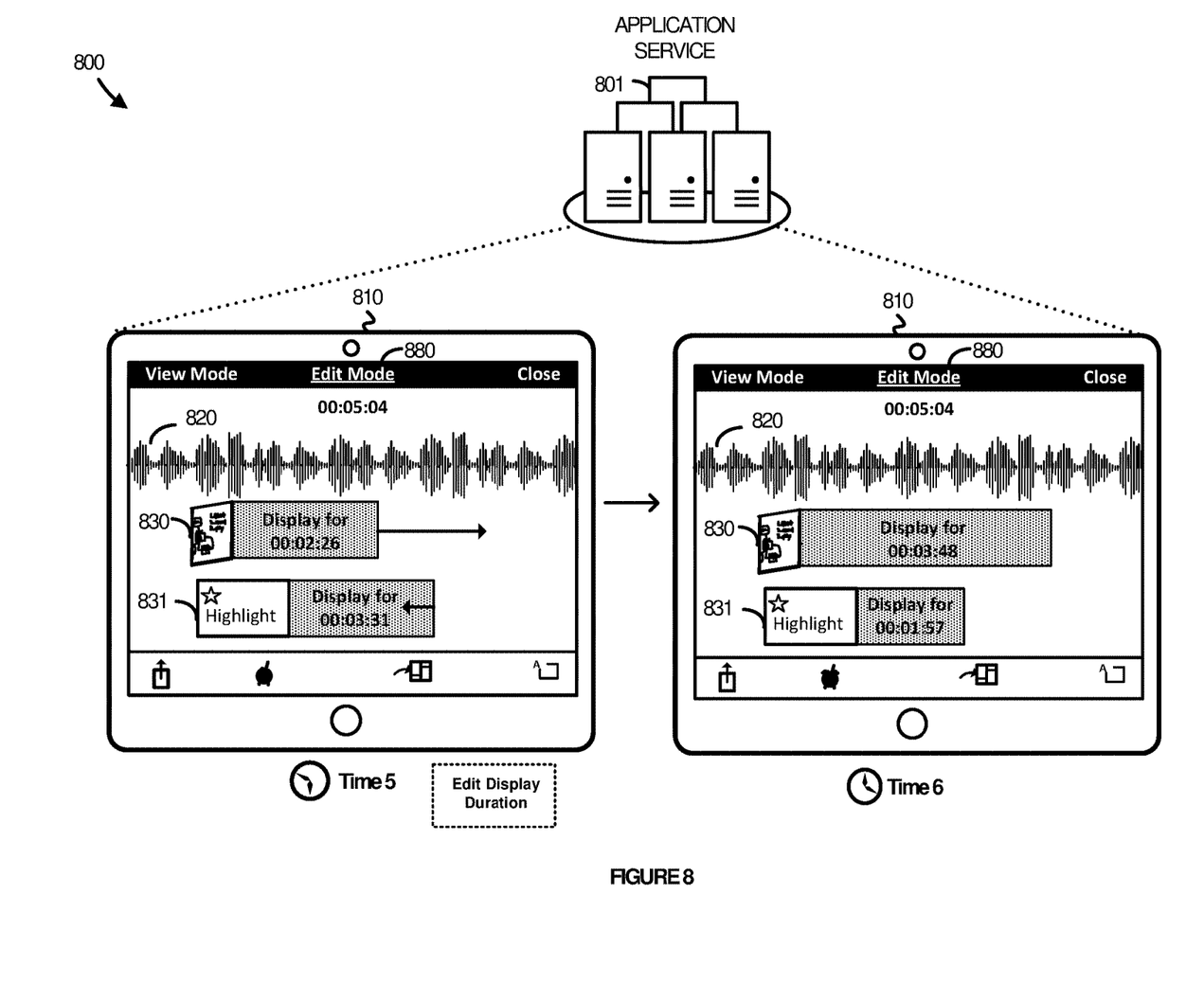
FIG. 8 illustrates an alternative operational architecture in an implementation of an enhanced application to display visual representations of entities associated with an audio recording.

FIG. 8 illustrates an exemplary operational architecture for displaying visual representations of entities associated with an audio recording that may be used in one or more scenarios of the present technology. FIG. 8 illustrates an operational scenario 800 that relates to what occurs when each enhancement item is associated with a display duration time which may be modified using an editing mode. Operational scenario 800 includes application service 801, user interface 810, waveform 820, and enhancement items 830-831. User interface 810 also includes an editing mode 880 which may be used to modify the display duration time of enhancement items 830-831. As seen at Time 5, application service 801 receives a user request to expand the duration that photo enhancement item 830 is displayed to a user on user interface 810. Additionally, application service 801 receives a request to shorten the duration within which highlight enhancement item 831 is displayed to a user. Therefore, at Time 6, application service 801 extends the display duration of photo enhancement item 830 and shortens the display duration of highlight enhancement item 831 in waveform 820 associated with the audio recording.

Figure 9:
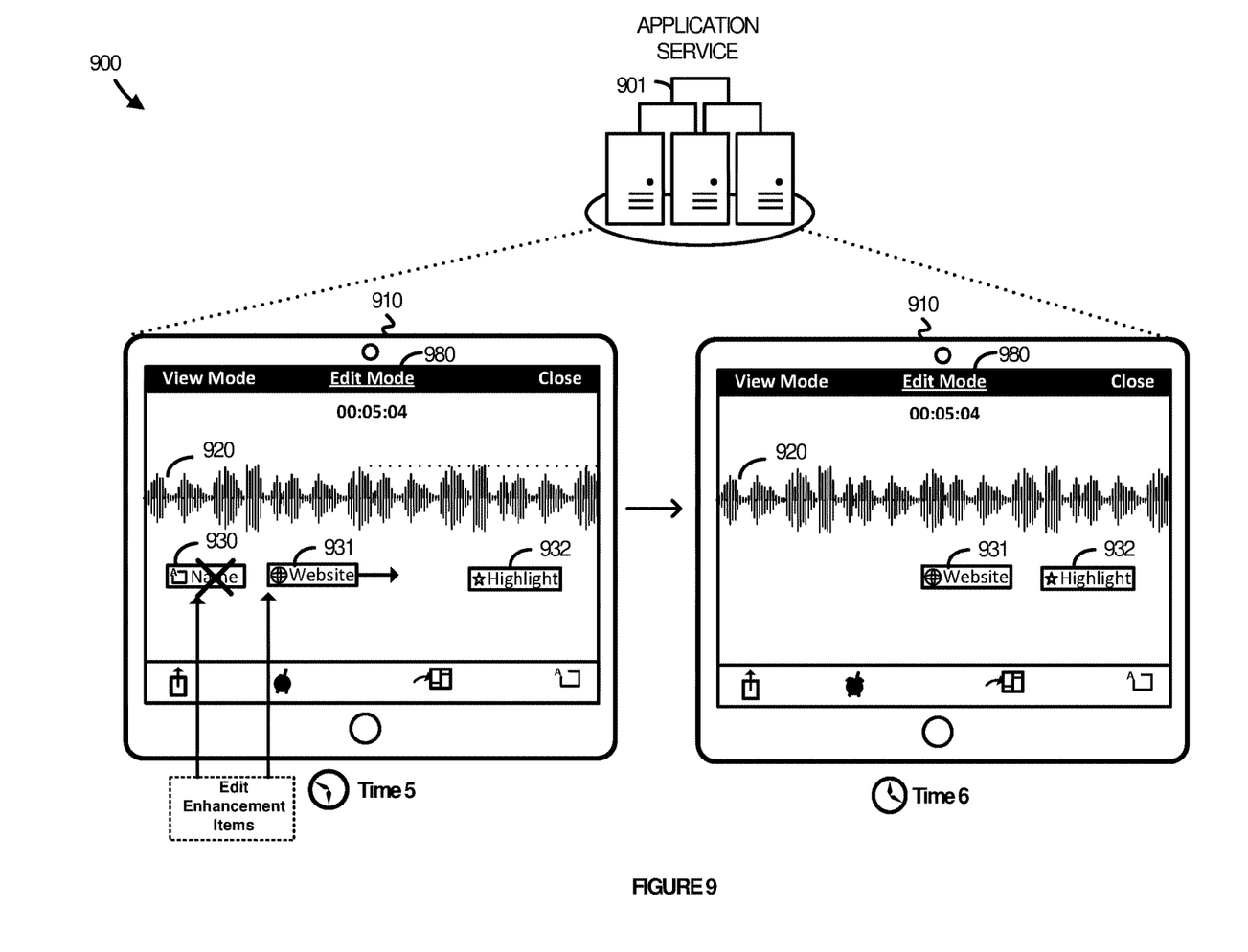
FIG. 9 illustrates an alternative operational architecture in an implementation of an enhanced application to display visual representations of entities associated with an audio recording.

FIG. 9 illustrates an exemplary operational architecture for displaying visual representations of entities associated with an audio recording that may be used in one or more scenarios of the present technology. FIG. 9 illustrates an operational scenario 900 that relates to what occurs when an enhancement item associated with an entity is rearranged by a user using an editing mode to the application. Operational scenario 900 includes application service 901, user interface 910, waveform 920, and enhancement items 930-932. User interface 910 also includes an editing mode 980 which may be used to organize, delete, add, or otherwise modify enhancement items 930-932. As seen at Time 5, application service 901 receives a user request to delete enhancement item 930 and move enhancement item 931 to a different location on waveform 920. Therefore, at Time 6, application service 901 omits the display of enhancement item 930 and modifies the timestamped location of enhancement item 931 in waveform 920 associated with the audio recording.

FIG. 10 illustrates computing system 1001, which is representative of any system or visual representation of systems in which the various applications, services, scenarios, and processes disclosed herein may be implemented. Examples of computing system 1001 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009. Processing system 1002 is operatively coupled with storage system 1003, communication interface system 1007, and user interface system 1009.

Processing system 1002 loads and executes software 1005 from storage system 1003. Software 1005 includes process 1006, which is representative of the processes discussed with respect to the preceding FIGS. 1-8, including presentation process 200. When executed by processing system 1002 to enhance an application, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device, but may also be distributed across multiple processing devices or sub-systems that cooperate in executing program instructions. Examples of processing system 1002 include general purpose central processing units, graphical processing unites, application specific processors, and logic devices, as well as any other type of processing device, combination, or variation.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 1003 may be implemented as a single storage device, but may also be implemented across multiple storage devices or sub-systems co-located or distributed relative to each other. Storage system 1003 may comprise additional elements, such as a controller, capable of communicating with processing system 1002 or possibly other systems.

Software 1005 may be implemented in program instructions and among other functions may, when executed by processing system 1002, direct processing system 1002 to operate as described with respect to the various operational scenarios, sequences, and processes illustrated herein. Software 1005 may include program instructions for implementing presentation process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtual machine software, or other application software, in addition to or that include process 1006. Software 1005 may also comprise firmware or some other form of machine-readable processing instructions executable by processing system 1002.

In general, software 1005 may, when loaded into processing system 1002 and executed, transform a suitable apparatus, system, or device (of which computing system 1001 is representative) overall from a general-purpose computing system into a special-purpose computing system to enhance application service for displaying visual representations of entities associated with an audio recording. Indeed, encoding software 1005 on storage system 1003 may transform the physical structure of storage system 1003. The specific transformation of the physical structure may depend on various factors in different implementations of this description. Such factors may include, but are not limited to, the technology used to implement the storage media of storage system 1003 and whether the computer-storage media are characterized as primary or secondary storage, as well as other factors.

If the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1009 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1009. In some cases, the input and output devices may be combined in a single device, such as a display capable of displaying images and receiving touch gestures. The aforementioned user input and output devices are well known in the art and need not be discussed at length here. User interface system 1009 may also include associated user interface software executable by processing system 1002 in support of the various user input and output devices discussed above.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

Example 1. A computing apparatus comprising: one or more computer readable storage media; one or more processors operatively coupled with the one or more computer readable storage media; and program instructions stored on the one or more computer readable storage media that, when read and executed by the one or more processors, direct the one or more processors to at least: present a waveform associated with an audio recording in a user interface to an application; identify a set of entities associated with the audio recording; present a set of enhancement items associated with the set of entities; and in response to a selection of a given one of the enhancement items, display a visual representation of an associated one of the entities in the user interface to the application.

Example 2. The computing apparatus of Example 1 wherein to identify the set of entities associated with the audio recording the program instructions direct the one or more processors to transcribe the audio recording into a text format and identify one or more portions of text from the text format of the transcribed audio recording.

Example 3. The computing apparatus of Examples 1-2 wherein the one or more portions of text comprises at least one of a name, website, event time, event location, and hashtag.

Example 4. The computing apparatus of Examples 1-3 wherein to identify the set of entities associated with the audio recording the program instructions direct the one or more processors to capture one or more entities along with the audio recording.

Example 5. The computing apparatus of Examples 1-4 wherein the one or more entities comprise at least one of a video and a photo.

Example 6. The computing apparatus of Examples 1-5 wherein each of the enhancement items associated with the set of entities further includes a timestamp indicating a time which the entity was introduced to the audio recording.

Example 7. The computing apparatus of Examples 1-6 wherein each of the enhancement items associated with the set of entities further includes a display duration indicating a duration of time within which the enhancement item is presented along with the waveform in the user interface to the application.

Example 8. The computing apparatus of Examples 1-7 further comprising, in response to displaying the visual representation of the entity, the program instructions direct the one or more processors to access the entity in an additional application.

Example 9. The computing apparatus of Examples 1-8 wherein the program instructions further direct the one or more processors to: in response to receiving an editing mode selection, present at least one of the enhancement items in an original location on the waveform associated with the audio recording; receive an instruction to modify the location of the at least one of the enhancement items on the waveform; and present the at least one of the enhancement items in the modified location on the waveform.

Example 10. A method comprising: present a waveform associated with an audio recording in a user interface to an application; identify a set of entities associated with the audio recording; present a set of enhancement items associated with the set of entities; and in response to a selection of a given one of the enhancement items, display a visual representation of an associated one of the entities in the user interface to the application.

Example 11. The method of Example 10 wherein identifying the set of entities associated with the audio recording comprises transcribing the audio recording into a text format and identifying one or more portions of text from the text format of the transcribed audio recording.

Example 12. The method of Examples 10-11 wherein the one or more portions of text comprises at least one of a name, website, event time, event location, and hashtag.

Example 13. The method of Examples 10-12 wherein identifying the set of entities associated with the audio recording comprises capturing one or more entities along with the audio recording.

Example 14. The method of Examples 10-13 wherein the one or more entities comprise at least one of a video and a photo.

Example 15. The method of Examples 10-14 wherein each of the enhancement items associated with the set of entities further includes a timestamp indicating a time which the entity was introduced to the audio recording.

Example 16. The method of Examples 10-15 wherein each of the enhancement items associated with the set of entities further includes a display duration indicating a duration of time within which the enhancement item is presented along with the waveform in the user interface to the application.

Example 17. The method of Examples 10-16 further comprising, in response to displaying the visual representation of the entity, accessing the entity in an additional application.

Example 18. The method of Examples 10-17 further comprising: in response to receiving an editing mode selection, presenting at least one of the enhancement items in an original location on the waveform associated with the audio recording; receiving an instruction to modify the location of the at least one of the enhancement items on the waveform; and presenting the at least one of the enhancement items in the modified location on the waveform.

Example 19. One or more computer readable storage media having program instructions stored thereon, wherein the program instructions, when executed by one or more processors, direct the one or more processors to at least: present a waveform associated with an audio recording in a user interface to an application; identify a set of entities associated with the audio recording; present a set of enhancement items associated with the set of entities; and in response to a selection of a given one of the enhancement items, display a visual representation of an entity associated with the given one of the enhancement items.

Example 20. The one or more computer readable storage media of Example 19 wherein to identify the set of entities associated with the audio recording the program instructions direct the one or more processors to at least capture one or more entities along with the audio recording, or transcribe the audio recording into a text format and identify one or more portions of text from the text format of the transcribed audio recording.

What is claimed is:

1. A device comprising:
    a processor; and
    a memory in communication with the processor, the memory comprising executable instructions that, when executed by the processor, cause the processor to control the device to perform functions of:
        recording a speech by a person to generate an audio recording of the speech;
        capturing, at a first time of recording the speech, a first enhancement element for the audio recording, the first enhancement element comprising a hashtag mentioned by the person in the audio recording at the first time;
        adding the first enhancement element to the audio recording, the first enhancement element being associated with a portion of the audio recording at the first time;
        causing a waveform visually representing the audio recording to be displayed via a graphical user interface (GUI);
        identifying the first enhancement element associated with the audio recording;
        causing a first visual representation of the first enhancement element to be displayed via the GUI, the first visual representation being displayed along with the waveform;
        receiving a first user input selecting the displayed first visual representation; and
        in response to the received first user input, causing the hashtag to be displayed via the GUI.

2. The device of claim 1, wherein the instructions, when executed by the processor, further cause the processor to control the device to perform functions of:
    causing a portion of the audio recording at a second time to be transcribed;
    causing text from the transcribed portion of the audio recording to be identified; and
    causing a second visual representation of a second enhancement element to be displayed via the GUI along with the waveform and first visual representation of the first enhancement element, the second enhancement element comprising the text.

3. The device of claim 2, wherein the text comprises at least one of a name, website, event time, event location and hashtag.

4. The device of claim 1, wherein the first enhancement element further comprises a timestamp indicating the first time at which the hashtag was mentioned by the person in the audio recording.

5. The device of claim 1, wherein the first enhancement element further comprises a display duration for which the first enhancement element is to be displayed along with the waveform via the display.

6. The device of claim 1, wherein the visual representation of the first enhancement element comprises a preview of the first enhancement element.

7. The device of claim 1, wherein the instructions, when executed by the processor, further cause the processor to control the device to perform functions of:
receiving a second user input selecting an editing mode;
in response to receiving the second user input, causing the first enhancement element to be presented at an original location on the waveform;
receiving a third user input modifying the original location of the first enhancement element on the waveform; and
in response to receiving the third user input, causing the first enhancement element presented at the modified location on the waveform.

8. A method of operating a device for displaying an enhancement element for an audio recording, the method comprising:
recording a speech by a person to generate an audio recording of the speech;
capturing, at a first time of recording the speech, a first enhancement element for the audio recording, the first enhancement element comprising a hashtag mentioned by the person in the audio recording at the first time;
adding the first enhancement element to the audio recording, the first enhancement element being associated with a portion of the audio recording at the first time;
causing a waveform visually representing the audio recording to be displayed via a graphical user interface (GUI);
identifying the first enhancement element associated with the audio recording;
causing a first visual representation of the first enhancement element to be displayed via the GUI, the being displayed along with the waveform;
receiving a first user input selecting the displayed first visual representation; and
in response to the received first user input, causing the hashtag to be displayed via the GUI.

9. The method of claim 8, further comprising:
causing a portion of the audio recording at a second time to be transcribed;
causing text from the transcribed portion of the audio recording to be identified; and
causing a second visual representation of a second enhancement element to be displayed via the GUI along with the waveform and first visual representation of the first enhancement element, the second enhancement element comprising the text.

10. The method of claim 9, wherein the text comprises at least one of a name, website, event time, event location and hashtag.

11. The method of claim 8, wherein the first enhancement element further comprises a timestamp indicating the first time at which the hashtag was mentioned by the person in the audio recording.

12. The method of claim 8, wherein the first enhancement element includes a display duration for which the first enhancement element is to be displayed along with the waveform via the display.

13. The method of claim 8, wherein the visual representation of the first enhancement element comprises a preview of the first enhancement element.

14. A non-transitory computer readable medium containing instructions which, when executed by a processor, cause a computer to perform functions of:
recording a speech by a person to generate an audio recording of the speech;
capturing, at a first time of recording the speech, an enhancement element for the audio recording, the enhancement element comprising a hashtag mentioned by the person in the audio recording at the first time;
adding the enhancement element to the audio recording, the enhancement element being associated with a portion of the audio recording at the first time;
causing a waveform visually representing an audio recording to be displayed via a graphical user interface (GUI);
identifying the enhancement element associated with the audio recording;
causing a visual representation of the enhancement element to be displayed via the GUI, the visual representation being displayed along with the waveform;
receiving a user input selecting the displayed visual representation; and
in response to the received user input, causing the hashtag to be displayed via the GUI.

15. The non-transitory computer readable medium of claim 14, wherein the visual representation comprises a preview of the enhancement element.

16. The non-transitory computer readable medium of claim 14, wherein the enhancement element further comprises a display duration for which the enhancement element is to be displayed along with the waveform via the display.

17. The non-transitory computer readable medium of claim 14, wherein the enhancement element further comprises a timestamp indicating the particular time at which the hashtag was mentioned by the person in the audio recording.

18. The non-transitory computer readable medium of claim 14, wherein the instructions, when executed by the processor, further cause the processor to control the computer to perform functions of:
receiving a second user input selecting an editing mode;
in response to receiving the second user input, causing the enhancement element to be presented at an original location on the waveform;
receiving a third user input modifying the original location of the enhancement element on the waveform; and
in response to receiving the third user input, causing the enhancement element presented at the modified location on the waveform.

* * * * *